US010599290B2

(12) United States Patent
Lemay et al.

(10) Patent No.: US 10,599,290 B2
(45) Date of Patent: Mar. 24, 2020

(54) SLIDE SHOW NAVIGATION

(71) Applicant: Apple Inc., Cupertino, CA (US)

(72) Inventors: Stephen O. Lemay, San Francisco, CA (US); Gregory N. Christie, San Jose, CA (US); Marcel van Os, San Francisco, CA (US); Hans-Werner Neubrand, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 738 days.

(21) Appl. No.: 15/201,202

(22) Filed: Jul. 1, 2016

(65) Prior Publication Data

US 2017/0031539 A1 Feb. 2, 2017

Related U.S. Application Data

(63) Continuation of application No. 13/396,161, filed on Feb. 14, 2012, now Pat. No. 9,384,470, which is a continuation of application No. 11/319,906, filed on Dec. 27, 2005, now Pat. No. 8,140,975.

(60) Provisional application No. 60/642,153, filed on Jan. 7, 2005.

(51) Int. Cl.
| | |
|---|---|
| *G06F 3/0482* | (2013.01) |
| *G06F 16/93* | (2019.01) |
| *G06Q 10/10* | (2012.01) |
| *G06F 3/0485* | (2013.01) |
| *G06F 3/0481* | (2013.01) |
| *H04L 12/58* | (2006.01) |

(52) U.S. Cl.
CPC .......... *G06F 3/0482* (2013.01); *G06F 3/0485* (2013.01); *G06F 16/93* (2019.01); *G06Q 10/107* (2013.01); *G06F 3/04817* (2013.01); *G06F 2203/04804* (2013.01); *H04L 51/22* (2013.01)

(58) Field of Classification Search
CPC ...... G06F 3/0482; G06F 3/0485; G06F 16/93; G06F 2203/04804; G06F 17/212; H04L 51/22; G06Q 10/107
See application file for complete search history.

(56) References Cited

U.S. PATENT DOCUMENTS

| | | |
|---|---|---|
| 7,076,730 B1 | 7/2006 | Baker |
| 7,102,643 B2 | 9/2006 | Moore et al. |
| 7,159,188 B2 | 1/2007 | Stabb et al. |
| 7,191,399 B2 | 3/2007 | Ohtani et al. |
| 7,243,298 B2 | 7/2007 | Yozell-Epstein et al. |

(Continued)

OTHER PUBLICATIONS

Office Action, dated Mar. 14, 2008, received in U.S. Appl. No. 11/319,906, 15 pages.

(Continued)

*Primary Examiner* — Roland J Casillas
(74) *Attorney, Agent, or Firm* — Morgan, Lewis & Bockius LLP (57) ABSTRACT

A slide show, integrated into an email application, displays images such as those included as an attachment to an email message. The user can view the slide show without exiting the email application. Slide show navigation controls are provided. An index sheet mode can be activated wherein a number of thumbnails are displayed, allowing easy navigation to any image within the slide show. Transition animations can be provided for clarifying operations such as activating and dismissing the index sheet.

27 Claims, 6 Drawing Sheets

(56) References Cited

U.S. PATENT DOCUMENTS

| | | | |
|---|---|---|---|
| 7,379,733 B2* | 5/2008 | Maes | G06Q 10/10 455/414.1 |
| 7,599,992 B2 | 10/2009 | Nakajima | |
| 7,882,185 B2 | 2/2011 | Nagarajan et al. | |
| 8,127,217 B2 | 2/2012 | Koppich et al. | |
| 8,826,148 B2 | 9/2014 | Yuniardi et al. | |
| 2003/0122863 A1 | 7/2003 | Dieberger et al. | |
| 2003/0160814 A1 | 8/2003 | Brown | |
| 2004/0125128 A1 | 7/2004 | Chang et al. | |
| 2004/0158607 A1 | 8/2004 | Coppinger et al. | |
| 2005/0108338 A1 | 5/2005 | Simske et al. | |
| 2005/0146534 A1* | 7/2005 | Fong | G06F 3/0219 345/619 |
| 2005/0149970 A1* | 7/2005 | Fairhurst | H04N 21/478 725/47 |
| 2006/0048067 A1* | 3/2006 | Despain | G06F 3/0481 715/768 |
| 2006/0069990 A1 | 3/2006 | Yozell-Epstein et al. | |
| 2006/0075033 A1 | 4/2006 | Bienstock et al. | |
| 2006/0075348 A1* | 4/2006 | Xu | G06F 3/0481 715/730 |
| 2008/0016491 A1 | 1/2008 | Doepke | |
| 2009/0177662 A1 | 7/2009 | Ryder | |
| 2010/0082680 A1 | 4/2010 | Ryder | |
| 2010/0083351 A1 | 4/2010 | Ryder | |

OTHER PUBLICATIONS

Office Action, dated Dec. 11, 2008, received in U.S. Appl. No. 11/319,906, 14 pages.
Final Office Action, dated Jul. 21, 2009, received in U.S. Appl. No. 11/319,906, 16 pages.
Office Action, dated Jan. 22, 2010, 2008, received in U.S. Appl. No. 11/319,906, 15 pages.
Final Office Action, dated Jul. 23, 2010, received in U.S. Appl. No. 11/319,906, 18 pages.
Office Action, dated Feb. 7, 2011 received in U.S. Appl. No. 11/319,906, 16 pages.
Final Office Action, dated Aug. 5, 2011, received in U.S. Appl. No. 11/319,906, 16 pages.
Notice of Allowance, dated Nov. 15, 2011, received in U.S. Appl. No. 11/319,906, 21 pages.
Office Action, dated Jun. 15, 2015, received in U.S. Appl. No. 13/396,161, 19 pages.
Final Office Action, dated Feb. 8, 2016, received in U.S. Appl. No. 13/396,161, 5 pages.
Notice of Allowance, dated Mar. 9, 2016, received in U.S. Appl. No. 13/396,161, 5 pages.

* cited by examiner

Document Info window (201A):
- Documents — 6.36 GB
- Modified Dec 10, 2004 2:53 PM
- ▷ Spotlight Comments:
- ▷ General:
- ▷ More info:
- ▷ Name & Extension:
- ▷ Preview:
- ▷ Ownership & Permissions:

302A — Untitled Folder 2 Info:
- Untitled Folder 2
- Modified: Dec 10, 1:55 PM
- ▽ Spotlight Comments
- ▽ General:
  - Kind: Folder
  - Size: Calculating
  - Where: /Volumes/J...
  - Created: Friday, Jan... 7:41 PM
  - Modified: Saturday, January 5, 2:55 PM
  - Color
  - Label:

302C — Documents Info:
- Documents — 30.2GB
- Modified: Dec 10, 2004
- Comments:
- (General)
  - der
  - Calculating Size
  - lumes/JunkYard
  - dnesday,
  - vember 25, 2003
  - 1 PM
  - day,
  - vember 30, 2003
  - :55 PM

302D — Documents Info:
- Documents
- Modified: Dec 10, 2004 1:55 PM
- ▽ Spotlight Comments:
- ▽ General:
  - Kind: Folder
  - Size: Calculating Size
  - Where: /Volumes/JunkYard
  - Created: Tuesday, October 20, 2003 4:41 PM
  - Modified: Wednesday, October 23, 2003 11:55 AM
  - Color
  - Label: ☒ ☐☐☐☐☐☐
  - ☐ Locked
- ▽ More Info:
  - Last opened: Thursday, December 9, 2004 6:41 PM

Volume Info (302G):
- Volume — 30.2GB
- Modified: Dec 10, 2004 1:55 PM
- ▽ Spotlight Comments:
- ▽ General:
  - Kind: Folder
  - Size: Calculating Size
  - Where: /Volumes/JunkYard
  - Created: Monday, June 8, 2003 6:05 PM
  - Modified: Wednesday, June 10, 2003 1:44 PM
  - Color
  - Label: ☒ ☐☐☐☐☐☐
  - ☐ Locked
- ▽ More Info:
  - Last opened: Thursday, December 9, 2004 6:41 PM
- ▷ Name & Extension:
- ▷ Preview:
- ▷ Ownership & Permissions:

302E — Documents Info:
- Documents
- Modified: Dec 10, 2004 1:55 PM
- ▽ Spotlight Comments:
- ▽ General:
  - Kind: Folder
  - Size: Calculating Size
  - Where: /Volumes/JunkYard
  - Created: Monday, September 10, 2003 3:41 PM
  - Modified: Tuesday, September 15, 2003 10:55 AM
  - Color
  - Label: ☒ ☐☐☐☐☐☐
  - ☐ Locked
- ▽ More Info:
  - Last opened: Thursday, December 9, 2004

Blue Monday.mp3 (302H):
- Blue Monday.mp3 — 4.1 MB
- Modified: Dec 10, 2004 1:55 PM
- ▽ Spotlight Comments:
- ▽ General:
  - Kind: Folder
  - Size: Calculating Size
  - Where: /Volumes/JunkYard
  - Created: Sunday, July 7, 2003 6:15 PM
  - Modified: Friday, June 11, 2003 1:30 PM
  - Color
  - Label: ☒ ☐☐☐☐☐☐
  - ☐ Locked
- ▽ More Info:
  - Last opened: Thursday, December 9, 2004 6:41 PM
- ▷ Name & Extension:
- ▷ Preview:
- ▷ Ownership & Permissions:

302F — Documents Info:
- Documents — 30.2GB
- Modified: Dec 10, 2004 1:55 PM
- ▽ Spotlight Comments:
- ▽ General:
  - Kind: Folder
  - Size: Calculating Size
  - Where: /Volumes/JunkYard
  - Created: Friday, May 1, 2003 2:41 PM
  - Modified: Saturday, May 5, 2003 4:55 PM
  - Color
  - Label: ☒ ☐☐☐☐☐☐
  - ☐ Locked
- ▽ More Info:
  - Last opened: Thursday, December 9, 2004

Junkyard Info (302I):
- Junkyard — 30.2GB
- Modified: Dec 10, 2004 1:55 PM
- ▽ Spotlight Comments:
- ▽ General:
  - Kind: Folder
  - Size: Calculating Size
  - Where: /Volumes/JunkYard
  - Created: Thursday, August 9, 2003 6:12 PM
  - Modified: Friday, August 10, 2003 1:40 PM
  - Color
  - Label: ☒ ☐☐☐☐☐☐
  - ☐ Locked
- ▽ More Info:
  - Last opened: Thursday, December 9, 2004 6:41 PM
- ▷ Name & Extension:
- ▷ Preview:
- ▷ Ownership & Permissions:

SLIDE SHOW NAVIGATION

RELATED APPLICATIONS

This application is a continuation of U.S. patent application Ser. No. 13/396,161, filed Feb. 14, 21012, which is a continuation of U.S. patent application Ser. No. 11/319,906 filed Dec. 27, 2005, now U.S. Pat. No. 8,140,975, which claims the benefit of U.S. Provisional Application No. 60/642,153 filed Jan. 7, 2005, each of which is incorporated by reference in its entirety.

The present invention is related to the following utility patent applications, the disclosures of which are incorporated herein by reference:

U.S. patent application Ser. No. 10/877,968 for "Layer for Accessing User Interface Elements," filed Jun. 25, 2004, now U.S. Pat. No. 7,490,295;

U.S. patent application Ser. No. 10/465,855 for "Computer Interface Having a Virtual Single-Layer Mode for Viewing Overlapping Objects," filed Jun. 20, 2003, now U.S. Pat. No. 8,127,248; and U.S. patent application Ser. No. 10/689,687 for "Computer Interface Having a Virtual Single-Layer Mode for Viewing Overlapping Objects," filed Oct. 22, 2003, now U.S. Pat. No. 7,739,617.

FIELD OF THE INVENTION

The present invention relates generally to displaying images within the context of an application such as an email application, and more particularly to improved techniques for navigating within a series of images such as a slide show.

BACKGROUND OF THE INVENTION

Conventionally, there is no convenient way to browse and view a series of image attachments received via email without leaving that email application. Images can appear inline in the body of the email, but browsing through a series of image attachments is restricted to vertically scrolling the body of the email. The presentation size of these image attachments is also restricted to the size of the email application view window, which is typically small. Existing software applications that allow a user to browse and view images, are not generally integrated into email applications. Additionally, a user may have to download and import the images into such software applications in order to view them, but this takes time and is often not desired when the user just wants to quickly see the images in a received email message.

In addition, it is often difficult to navigate within a series of images such as within a slide show. An image may be shown, with arrows for moving forwards and backwards. Such a display does not facilitate instantaneous movement from one image to a second image that is not adjacent to the first. Such a display also fails to provide the user with a sense of the context of the current image within the overall slide show or set of images. There is no easy and convenient way to switch between the full-sized view and a view that reveals context.

Image navigation systems and software often provide a series of thumbnails, allowing the user to click on a thumbnail to see a full-sized version of the corresponding image. However, these schemes still provide no easy way to easily switch between a full-sized view and a view that provides context showing where the image fits within the overall slide show.

SUMMARY OF THE INVENTION

The present invention provides an improved mechanism for navigating within a series of images such as a slide show.

According to one aspect of the present invention, image attachments can be easily viewed without leaving an email application.

According to one aspect of the present invention, images are presented in a manner that provides for easy switching between full-sized and thumbnail view, and that preserves a sense of context so that the user knows where the image fits within the overall slide show. The user can easily switch between modes, and can easily move to any image within the slide show or image series.

According to one aspect of the present invention, the invention provides a full-screen slide show environment, with easy access to instantaneous navigation controls and thumbnails, all accessible directly within an email application.

BRIEF DESCRIPTION OF THE DRAWINGS

The accompanying drawings illustrate several embodiments of the invention and, together with the description, serve to explain the principles of the invention.

FIG. 3 is a screen shot depicting an example of an index sheet, according to one embodiment of the present invention.

One skilled in the art will recognize that these Figures are merely examples of the operation of the invention according to one embodiment, and that other user interface arrangements and modes of operation can be used without departing from the essential characteristics of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

For illustrative purposes, the invention is described in connection with presenting images in an email application for an operating system such as MacOS X from Apple Inc. Various specific details are set forth herein and in the Figures, to aid in understanding the present invention. However, such specific details are intended to be illustrative, and are not intended to restrict in any way the scope of the present invention. In particular, one skilled in the art will recognize that the invention can be used for navigating among images and/or other non-image elements within any type of software application. In addition, one skilled in the art will recognize that the invention can be used in connection with any input mechanism for selecting, manipulating, and moving onscreen images, including manipulation of an onscreen cursor using a pointing device, keyboard control, voice control, mouse wheel, touch screen control, or the like, or any combination of the above. In addition, the particular screen layouts, appearance, and terminology as depicted and described herein, are intended to be illustrative and exemplary, and in no way limit the scope of the invention.

In one embodiment, the present invention is implemented in a conventional personal computer system, such as a Macintosh, (available from Apple Inc. of Cupertino, Calif.), running an operating system such as MacOS X (also available from Apple Inc.). The invention may be embodied in software that runs on the personal computer. The invention may be included as add-on software, or it may form part of the operating system itself, or it may be a feature of an application that is bundled with the computer system or sold separately. The various features of the invention as described herein include output presented on a display screen that is connected to the personal computer. In addition, the invention makes use of input provided to the computer system via input devices such as a keyboard, mouse, touchpad, or the like.

Such hardware components, including their operation and interactions with one another and with a central processing unit of the personal computer, are well known in the art of computer systems and therefore are not depicted here. Several Figures are presented as screen shots depicting examples of the user interface as it might appear on a display screen or other output device. In addition, the techniques described herein can be implemented in other types of devices, including cell phones, personal digital assistants, television displays, kiosks, or the like.

User Experience

Figure 1:
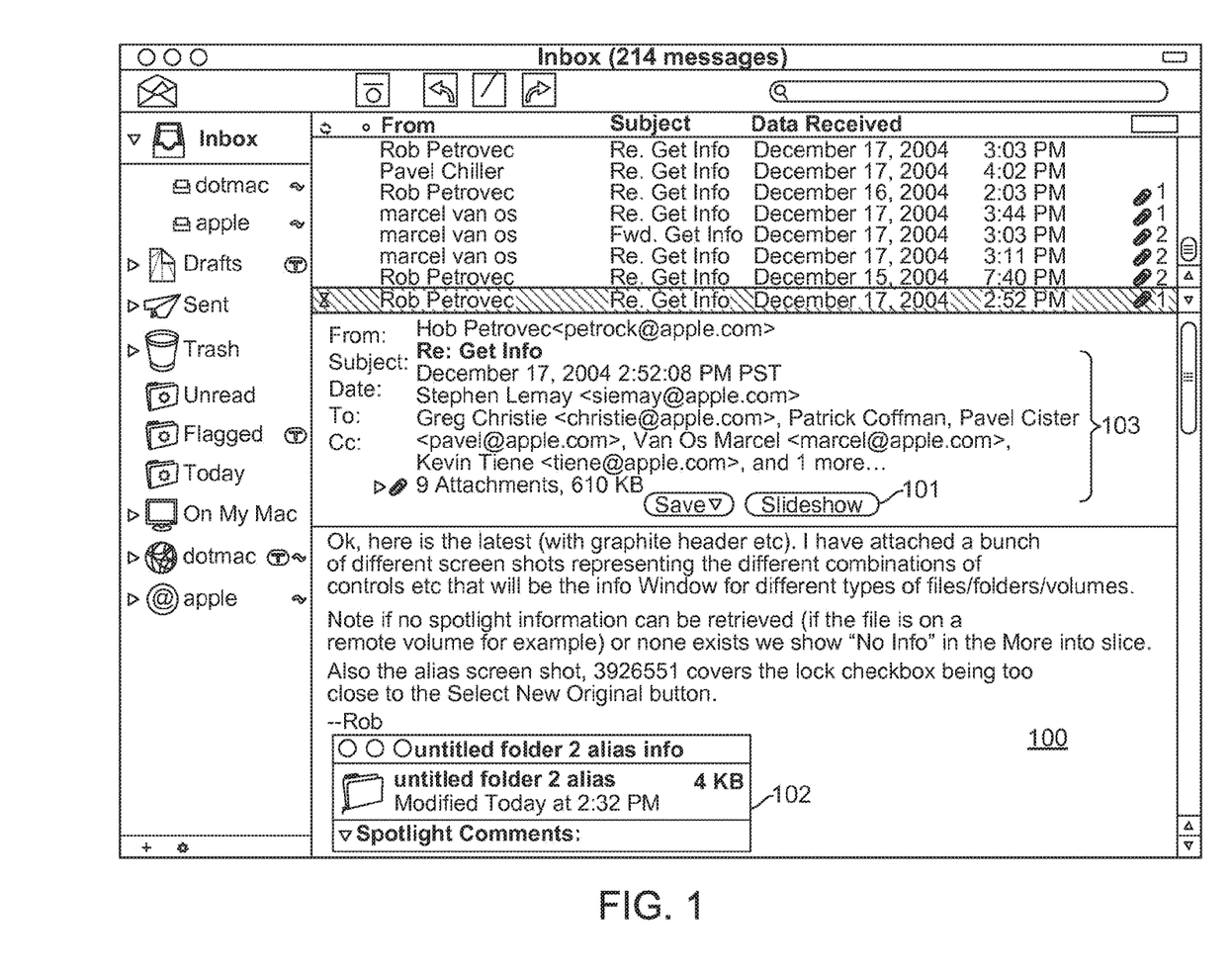
FIG. 1 is a screen shot depicting an example of an email client application with a slide show button, according to one embodiment of the present invention.

In one embodiment, the invention operates as follows:

Referring now to FIG. 1, there is shown a screen shot depicting an example of an email client application displaying a message 100. The user receives email message 100 that includes one or more image attachments 102. Slide show button 101 appears in header region 103 of message 100. In one embodiment, button 101 is only presented if message 100 contains images. In other embodiments, other mechanisms for activating a slide show may be provided, including keyboard commands, menu items, or the like.

Figure 2:
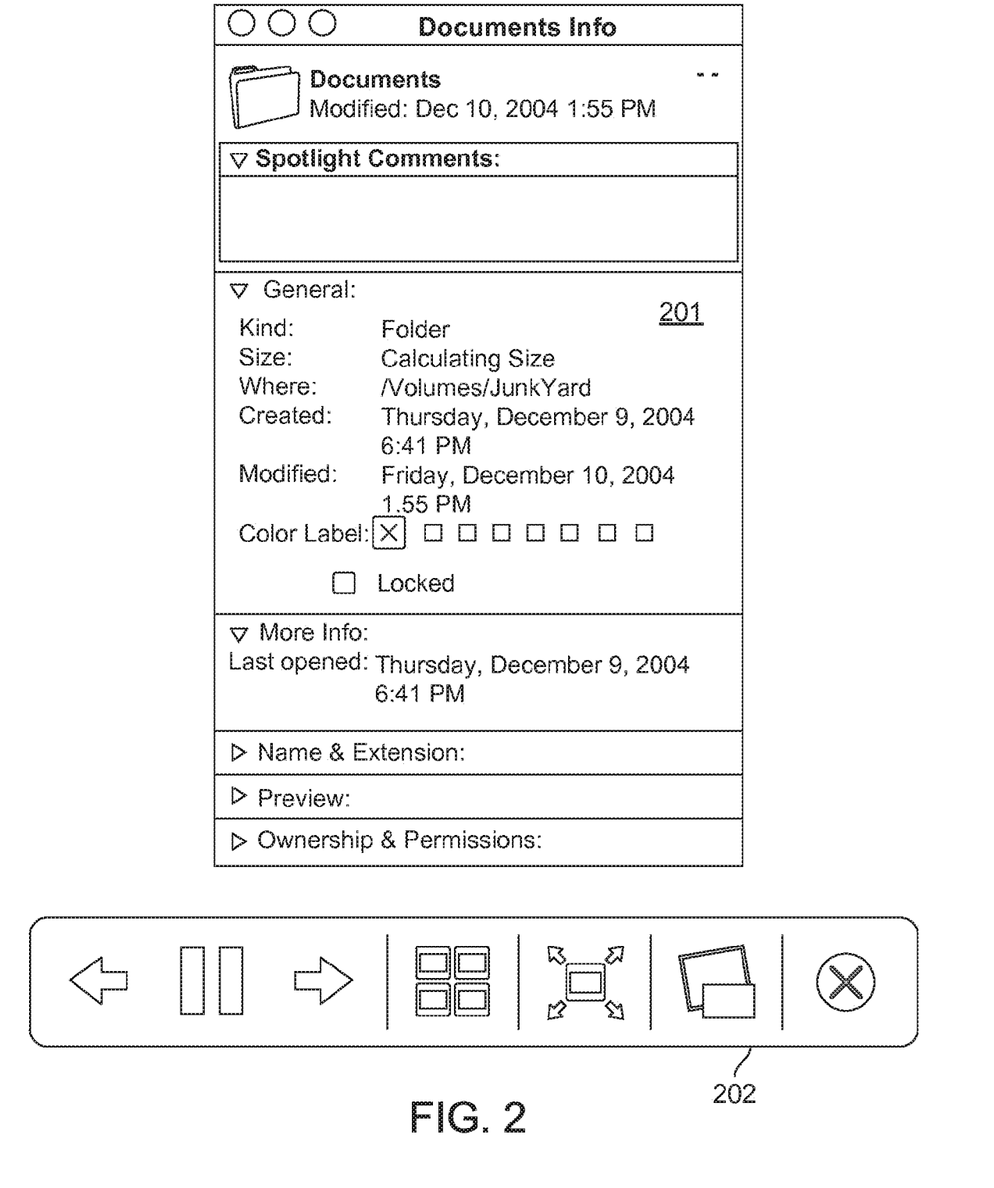
FIG. 2 is a screen shot depicting an example of an image being displayed in a slide show, according to one embodiment of the present invention.

The user can click on button 101 to initiate a slide show. The computer screen fades to black and then fades into a full screen view of the first image attachment. Referring now to FIG. 2, there is shown a screen shot depicting an example of an image 201 being displayed in a slide show, according to one embodiment of the present invention.

After a period (for example 3 seconds), the first image 201 fades into the next image attachment in the sequence, and so on until all the images have been viewed. Then, in one embodiment, the slide show repeats.

In an alternative embodiment, the slide show is presented within a window rather than occupying the entire screen. In another alternative embodiment, the slide show is presented in semi-transparent form overlaying the normal desktop display. In one embodiment, any or all of the characteristics of the slide show are configurable by the user (for example, whether it repeats, the size of the presentation, delay between one slide and the next, and the like).

Semi-transparent toolbar cluster 202 (or dock) appears at the bottom of the screen. It contains a series of buttons that allow the user to interact with the slide show. From left to right they are:

Back: Go to the previous image.
Play/Pause: Animate the slideshow from one image to the next, or pause on the current frame
Next: Go to the next image
Index Sheet: Show all the images in this slideshow.
Full Screen/Actual Size: Toggle between showing the image at its actual size and showing it scaled up to fit the computer screen
Add to iPhoto: Automatically add the current image to iPhoto
Exit Slideshow: Exit the full screen slideshow presentation and return to the application view.

Index Sheet

The Index Sheet button provides quick access to a screen depicting thumbnails. This may be overlaid on the existing desktop, as an opaque screen or a semi-transparent one. In one embodiment, the index sheet can be activated by moving the cursor to a predefined corner of the screen. The index sheet allows a user to easily see the context of the current image within the slide show, and also allows the user to quickly jump to any other image in the slide show.

Referring now to FIG. 3, there is shown a screen shot depicting an example of an index sheet 301, according to one embodiment of the present invention.

When the user presses the Index Sheet button in cluster 202 (or otherwise activates the index sheet), the current image 201 animates and scales smaller. At the same time all the other images in the slideshow also animate and scale smaller behind the current image. As the images scale smaller, they align along a position in a grid that reflects the order of the slideshow presentation, as shown in FIG. 3. The first image appears as a thumbnail 302A in the upper left, the next image appears as a thumbnail 302B to the right of the first image, and so on. The spreadout view of all the image thumbnails 302A through 302J forms index sheet 301; it is organized in a rectangular grid akin to a photographic contact sheet that shows a number of images on a single page. In one embodiment, all images are scaled to the same size, or to approximately the same size except for deviations resulting from different aspect ratios. In one embodiment, the size of the thumbnails 302 is selected according to the number of images and the size of the available viewable area. In one embodiment, if there are too many images to show all thumbnails 302 within the viewable area, a scrolling arrangement or other arrangement for viewing subsets of the thumbnails 302 is used. In one embodiment, the size is specified by a user.

In one embodiment, thumbnails 302 are arranged according to the image sequence within the slide show. In one embodiment, the presentation is according to filename (alphabetically), or chronological order by date modified or date created, or size, or some other ordering mechanism. In one embodiment, the user can dynamically select the order.

The user can roll over any thumbnail 302 (in other words, cause the onscreen cursor to hover over the image) to reveal its title 303 and/or to see other information about the image. In one embodiment, such information is shown in a semi-transparent manner superimposed on thumbnail 302 itself, as shown in the example of FIG. 3. In other embodiments, any other technique for displaying such information can be used. Any type of information can be displayed, including for example title, size, date created, date modified, or the like.

Clicking on a thumbnail 302 advances the slide show to that image and exits Index Sheet mode; the selected image animates and scales to full screen size while all the other images appear to scale to full screen size behind the selected image. Alternatively, the non-selected images may shrink until they are invisible, or they may fade to invisibility, or simply disappear as the selected image expands to fill the screen. Alternatively, they may simply appear to move behind the selected image.

Figure 4:
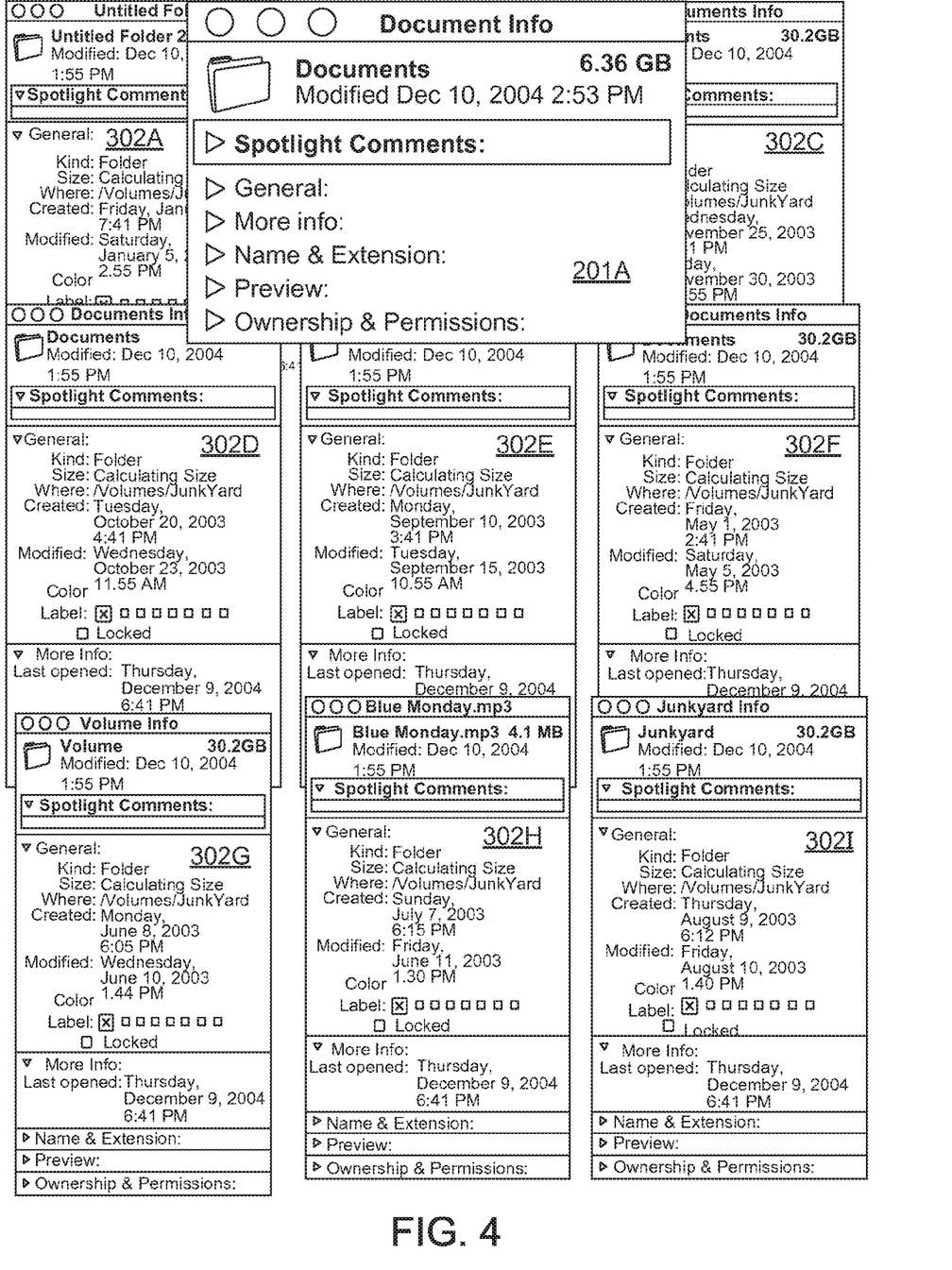
FIG. 4 is a screen shot depicting an example of a transition that takes place after the user has selected a thumbnail from the index sheet, according to one embodiment of the present invention.
Figure 5:
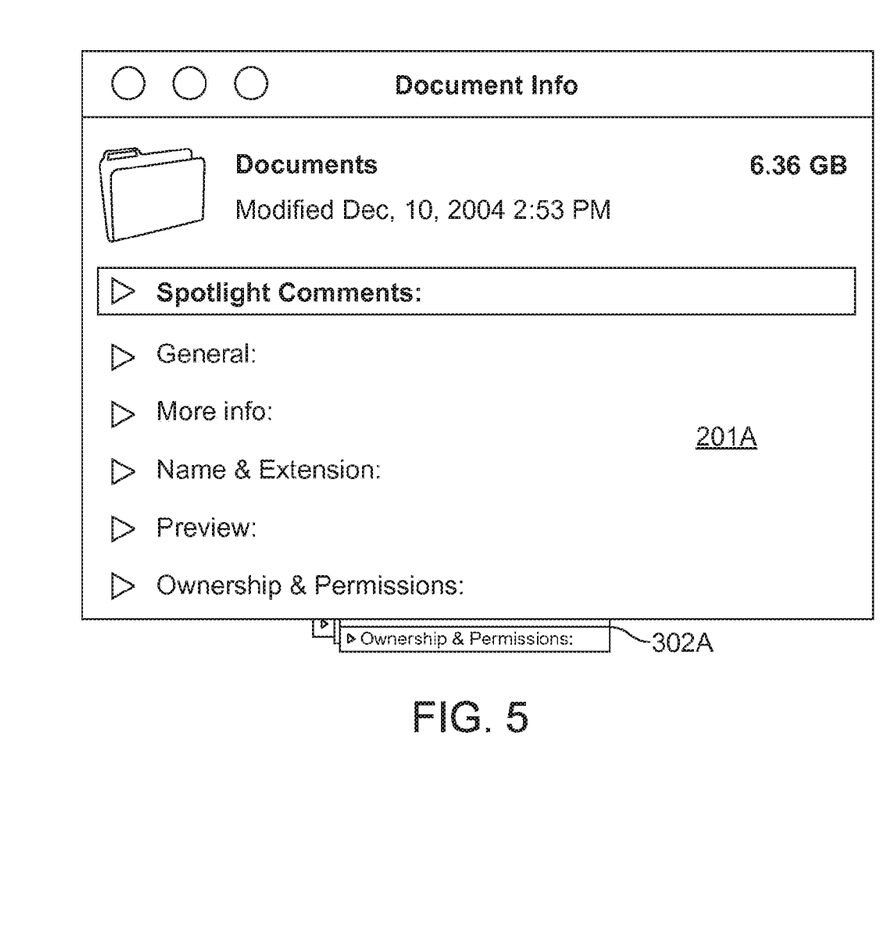
FIG. 5 is a screen shot depicting a continuation of the example transition of FIG. 4, according to one embodiment of the present invention.

FIGS. 4 and 5 depict an example of the transition between index sheet 301 and a full-screen display of image 201A. In FIG. 4, thumbnails 302A through 302J have begun to shift position behind selected image 201A, which has enlarged to full size. In FIG. 5, thumbnails 302A through 302J have moved so that they are almost completely hidden by selected image 201A; they are also stacked on top of one another.

One skilled in the art will recognize that any other transition effect (or no transition effect) can be implemented without deviating from the essential characteristics of the present invention.

Add to iPhoto

At any point in the slide show presentation, the user can press the Add to iPhoto button to automatically add the currently viewed image to a photo management application (such as iPhoto, available from Apple Computer of Cupertino, Calif.) without exiting the slide show presentation. In one embodiment, the software displays an animation showing the currently viewed image being sucked into the Add to iPhoto button. This feature allows a user to browse a large series of images, and to easily choose which images he or she would like to import and keep for future use.

The present invention provides a slide show that is accessible from and works within an email application. As such, it does not require the user to leave the email environment in order to view their image attachments in an effective, versatile, full-screen, and pleasant way. In other embodiments, the features described above are provided within other types of applications, such as a file management application, presentation software, word processing software, or the like.

Architecture

In one embodiment, the above-described functionality is implemented as a standalone framework, so that any application or client can generate a user experience such as that described above. The present invention can be implemented in connection with images, PDF documents, text documents, or any other items or elements that can be presented visually.

In one embodiment, the invention is implemented as an application programming interface (API) in objC and/or C, using a known technology such as ImageIO to load images of multiple formats. Image formats include, for example, TIFF, JPEG, PNG, GIF, or the like. Image inputs can be provided in any of a number of forms that either contain or point to images. Examples include file paths, URLs, NSFileWrappers, NSImages, CGImageRefs, or the like.

In one embodiment, the invention includes a dynamically created user interface that adapts to environmental conditions and/or client feature sets. For example, in one embodiment, an Add to iPhoto button may be made available only if 1) the client application includes functionality for exporting images to iPhoto (i.e., if such an operation makes sense given the nature of the application), and 2) the iPhoto application is installed; otherwise, the Add to iPhoto button is not shown. In other environments or clients, the user interface may include other elements that are appropriate to those environments. For example, when the slide show of the present invention is being used in connection with an image viewer or search function, an Add to Mail button can be provided within the button cluster; when activated, this button would launch an email application and create a new email message with the selected image(s) attached. One skilled in the art will recognize that in other contexts, other buttons and operations would be applicable.

In one embodiment, the present invention displays various types of transitions. For example, when switching from one image to the next (in play mode, or in response to a user command), a distinctive transition may be shown; similarly, when switching from full-sized image mode to thumbnail mode, another transition may be shown. In one embodiment, these transitions are user-configurable. In one embodiment, they are implemented using a known video animation technology, assuming that the hardware video card supports such technology. In one embodiment, multiple transitions are available and can be applied in any combination.

In one embodiment, a particular type of transition and visual effect is used when switching from full-sized image mode to thumbnail mode and vice versa. An affine transform (translate/scale) is applied to position each image during the index transform and in index sheet mode. In one embodiment, the thumbnail display is presented in a semi-transparent window so that underlying elements (such as the desktop or the full-sized image that was being displayed) are visible through the thumbnail display. One skilled in the art will recognize that such visual enhancements are optional, and that the present invention can be implemented using many different types of visual techniques.

In one embodiment, the Add to iPhoto function is performed using AppleScript. The system of the invention keeps track of the images that a user wants to add to iPhoto. Upon quitting or closing the slide show, iPhoto is automatically launched, and the selected images are added to iPhoto under the direction of an AppleScript script.

Figure 6:
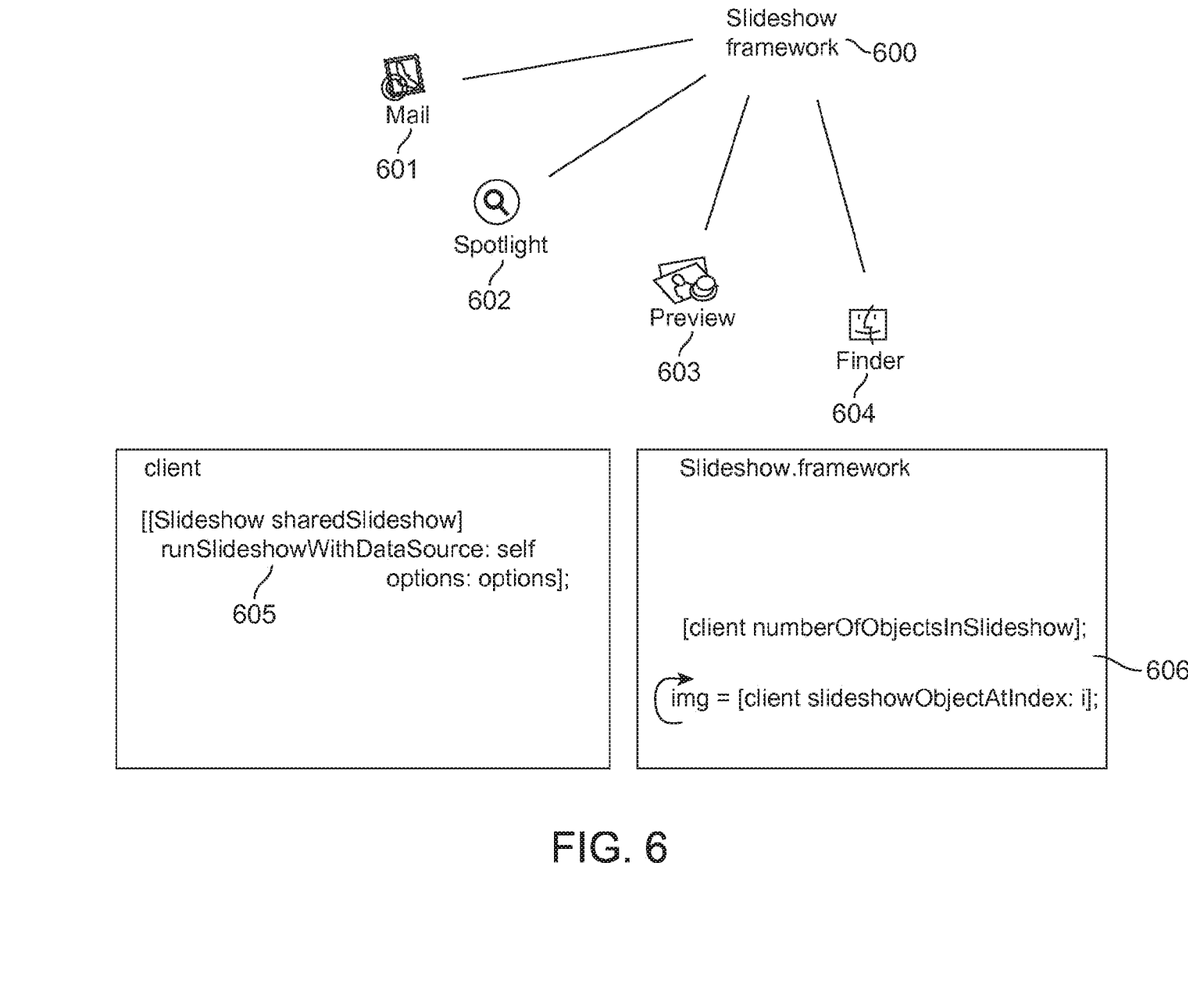
FIG. 6 is a block diagram depicting an example of a software architecture for implementing the present invention according to one embodiment.

Referring now to FIG. 6, there is shown a block diagram depicting an example of a software architecture for implementing the present invention according to one embodiment. Slideshow framework 600 is software code that implements the invention. Any client application can call upon and interface with framework 600; examples of such applications include an email application 601, search application (such as Apple's Spotlight) 602, viewer application (such as Apple's Preview) 603, or file management component of an operating system (such as Apple's Finder) 604.

Also shown is an example of code 605 that can be used by the calling application to invoke the slide show feature. Also shown is an example of code 606 in framework 600 for interfacing with the calling application.

Examples of header files for use in connection with an implementation of the present invention is as follows:

```
Slideshow.h
    #import <AppKit/AppKit.h>
    #import <ApplicationServices/ApplicationServices.h>
    @class SlideshowPrivateVars;
```

```
// Slideshow data source
//----------------------------------------------------------------------------------------

@interface NSObject(SlideshowDataSource)
    // required
    -       (int)numberOfObjectsInSlideshow;
    -       (id)slideshowObjectAtIndex: (int)index;
// optional
    -       (NS String*)slideshowObjectNameAtIndex: (int)index;
    -       (BOOL)canExportObjectAtIndexToiPhoto: (int)index;
    -       (void)exportObjectsToiPhoto: (NSIndexSet*)indexSet; @end
// Slideshow
//----------------------------------------------------------------------------------------

@interface Slideshow : NSResponder
    {
            @private
            SlideshowPrivateVars * mPrivateData;
    }
    +       (Slideshow*)sharedSlideshow;
    +       (void)addImageToiPhoto: (id) image;
    // To start the Slideshow for images:
    // - either use setDataSource/startSlideshow
    -       (void) setDataSource: (id) dataSource;
    -       (void) startSlideshow: (id) sender;
    //      or use runSlideshowWithDataSource (preferred way)
    -       (void)runSlideshowWithDataSource: (id)sender
                                    options: (NSDictionary*) slideshowOptions;
    // To start the Slideshow for a PDF:
    -       (void) runSlideshowWithPDF: (NSURL*)pdfURL
                            options: (NSDictionary*)slideshowOptions;
    -       (void) stopSlideshow: (id) sender;
    -       (void)noteNumberOfItemsChanged;
    -       (void)reloadData;
    -       (int)indexOfCurrentObject;
    -       (void) setAutoPlayDelay: (float) seconds;
    @end
    // slideshow option keys:
    //---------------------------------------------------------------------------------------- extern NSString *const SlideshowDontAutoShowMenuBar;
// boolean
    extern NSString *const SlideshowStartIndex;
// number
    extern NSString *const SlideshowAutoPlayDelay;
// number (in seconds)
    extern NSString *const SlideshowPDFDisplayBox;
// PDFDisplayBox (see PDFKit)
    extern NSString *const SlideshowPDFDisplayMode;
// PDFDisplayMode (see PDFKit)
    extern NSString *const SlideshowPDFDisplaysAsBook;
// boolean
    extern NSString *const SlideshowDebugMode;
// boolean (if YES - only capture main display)
    // notifications a data source may register for:
    //---------------------------------------------------------------------------------------- extern NSString *const SlideshowDidStopNotification;
    extern NSString *const SlideshowDidChangeNotification;
Export2iPhoto.h
    #import <Cocoa/Cocoa.h>
    @class Export2iPhotoPrivateVars;
    @interface Export2iPhoto : NSObject
    {
            @private
            Export2iPhotoPrivateVars * mPrivateData;
    }
    +       (BOOL)canExportToiPhoto;
    +       (BOOL)isPhotoFile:  (id)file
            allowConversion:    (BOOL)allowFormatConversion;
    +       (BOOL)exportFile:   (id)file;                         //
file can be: NSFileWrapper
NSURL                                                             //
NSString                                                          //
NSImage                                                           //
                                                                  //
NSArray of any of the above...
    @end
SlideshowCarbon.h
```

```
#ifndef __SLIDESHOWCARBON__
#define __SLIDESHOWCARBON__
#if PRAGMA_ONCE
#pragma once
#endif
#include <ApplicationServices/ApplicationServices.h>
#ifdef __cplusplus
extern "C" {
#endif
// callbacks
    typedef CALLBACK_API_C (UInt32,     SlideshowNumberOf
URLsProc ) ( ) ;
    typedef CALLBACK_API_C ( CFURLRef , SlideshowCopyURLA-
tIndexProc )(UInt32 index);
    typedef CALLBACK_API_C ( Boolean,  SlideshowCanExport
URLAtIndexProc )(UInt32 index);
    typedef CALLBACK_API_C ( void,     SlideshowDidSwitch
ToIndexNotificationProc )(UInt32 index);
    typedef CALLBACK_API_C ( void,     SlideshowDidEndNotification
Proc ) (UInt32 index);
    typedef struct SlideshowCallbacks
    {
        SlideshowNumberOfURLsProc              sNumberOfURLsProc;
        SlideshowCopyURLAtIndexProc            sCopyURLAtIndexProc;
        SlideshowCanExportURLAtIndexProc       sCanExportURLAtIndexProc;
        SlideshowDidSwitchToIndexNotificationProc sDidSwitchToIndexNotificationProc;
        SlideshowDidEndNotificationProc        sEndNotificationProc;
    } SlideshowCallbacks;
    // Slideshow C APIs
    OSStatus SlideshowRunWithOptions(CFDictionaryRef
options,
                                        SlideshowCallbacks
callbacks);
    OSStatus SlideshowStop( );
    // slideshow option keys:
    // /-----------------------------------------------------------------------------------
    extern const CFStringRef kSlideshowDontAutoShowMenu-
Bar;      // boolean
    extern const CFStringRef kSlideshowStartIndex;
// number
    extern const CFStringRef kSlideshowAutoPlayDelay;
// number (in seconds)
    extern const CFStringRef kSlideshowDebugMode;
// boolean (if YES - only capture main display)
#ifdef __cplusplus
}
#endif
#endif /* __SLIDESHOWCARBON__ */
```

Application Programming Interface for objC Client

The following is a description of an application programming interface for accessing the functionality of the present invention via an objC client:

SlideshowDataSource Informal Protocol

When a client wants to use the slide show functionality, the client adopts the following informal SlideshowData-Source protocol, using the following two methods:

| | |
|---|---|
| – (int)numberOfObjectsInSlideshow; | This method is called by the Slide-show framework to find out the total number of images the client wants to display. |
| – (id)slideshowObjectAtIndex: (int)index; | Called by the Slideshow framework, this method is used to get an image for a given index. In one embodiment, the 'image' returned can be of one of the following types:<br>NSString (path to image file on disk)<br>NSURL<br>NSFileWrapper<br>NSImage<br>CGImageRef |

In one embodiment, the following additional methods are available as well:

| | |
|---|---|
| – (NSString*) slideshowObjectNameAtIndex: (in::) index; | This method is called by the Slide-show framework if the image returned by slideshowObjectAtIndex is of type NSImage or CGImageRef - these two variants do not contain an image name.<br>If the client does return an NSImage or a CGImageRef and does not implement |

-continued

| | |
|---|---|
| | slideshowObjectNameAtIndex, Slideshow displays a generic (Image #) name in the index mode. |
| - (BOOL) canExportObjectAtIndexToiPhoto: (Int) index; | If a client implements this method, Slideshow calls canExportObjectAtIndex TolPhoto to enable/disable the 'Export to iPhoto' button. If the client does not implement this method -or- iPhoto is not installed -or-an old (incompatible version) of iPhoto is installed, the 'Export to iPhoto' button is not shown in the UI. |
| - (void) exportObjectsToIPhoto: (NSIndexSet*) indexSet; | If the user has used the 'Add to iPhoto' action, Slideshow calls the client with an NSIndexSet that contains all indices of the images that should be exported to iPhoto. |

The following methods are also provided in the Slideshow API:

| | |
|---|---|
| + (Slideshow*) sharedSlideshow; | This class method returns an instance of a Slideshow that can be used to display images or PDFs. |
| + (void) addImageToiPhoto: (id) image; | A handy way to add images to iPhoto.<br>It takes as parameter:<br>  NSString (path to image file on disk)<br>  NSURL<br>  NSFileWrapper<br>  NSImage<br>  CGImageRef<br>  NSArray (array of any of the above) |
| - (void) setDataSource: (id)dataSource;<br>- (void)startSlideshow: (id) sender; | One of two ways to start a Slide show:<br>setDataSource followed by startSlideshow. |
| - (void) runSlideshowWithDataSource: (id) sender options: (NSDictionary*) slideshowOptions; | A second way to start the Slideshow.<br>Parameters:<br>  dataSource<br>  options:<br>  SlideshowDontAutoShowMenuBar<br>  SlideshowStartIndex<br>  SlideshowAutoPlayDelay |
| - (void) runSlideshowWithPDF: (NSURL*)pdfURL options: (NSDictionary*) slideshowOptions; | Used to start a slideshow with a PDF.<br>Parameters:<br>  NSURL of the PDF<br>  options<br>  SlideshowPDFDisplayBox<br>  SlideshowPDFDisplayMode<br>  SlideshowPDFDisplaysAsBook |
| - (void) stopSlideshow: (id) sender; | Used to abort/stop a slideshow. |
| - (int) indexOfCurrentObject; | Allows the client to find out the index of the currently displayed image. |
| - (void) setAutoPlayDelay: (float)seconds; | Allows the client to set the auto-play-delay. |
| SlideshowDidStopNotification | Notification the client may register for. Called when the Slideshow stops (the user did press the cancel button or hit escape) |
| SlideshowDidChangeNotification | Notification the client may register for. Called when the Slideshow changes from one image to another (either in auto-play or in manual previous/next or via index sheet). |

In one embodiment, Export2iPhoto is provided as a helper class used to export images to a photo management application such as iPhoto. It can also be used outside of a running Slideshow. The following methods are pro-vided in the Export2iPhoto API:

| | |
|---|---|
| + (BOOL)canExportToiFhoto | Returns YES if iPhoto is installed.<br>It checks also for the correct version of iPhoto. |
| + (BOOL)isFhotoFile: (id) file allowConversion: (BOOL) allowFormatConversion; | Returns YES if a given image can be exported to iPhoto. If the image is in a format that iPhoto does not handle directly, the caller has the option to do a format conversion first. |
| + (BOOL)exportFile: (id) file; | Exports the given file(s) to iPhoto<br>It takes as parameter:<br>  NSString (path to image file on disk)<br>  NSURL<br>  NSFileWrapper<br>  NSImage<br>  CGImageRef<br>  NSArray (array of any of the above) |

Application Programming Interface for Carbon Client

The following is a description of an application programming interface for accessing the functionality of the present invention via a Carbon client:

| | |
|---|---|
| OSStatus SlideshowRunWithOptions (CFDictionaryRef options, SlideshowCallbacks callbacks); | C API to start the Slideshow with the specified options:<br>kSlideshowDontAutoShowMenuBar<br>kSlideshowStartIndex<br>kSlideshowAutoPlayDelay.<br>callbacks is an array of function pointers that specify the number of images, image location,<br>. . .<br>sNumberOfURLsProc: This callback is called by the Slideshow framework to find out the total number of images the client wants to display.<br>sCopyURLAtIndexProc is called to get the image (CFURLRef) at a given index (required).<br>sCanExportURLAtIndexProc<br>This callback is called to find out if the image at a given index can be exported to iPhoto.<br>sDidSwitchToIndexNotificationProc<br>This callback is called to notify client that the user switched to a different image.<br>sEndNotificationProc<br>This callback is called to notify the client that the user has ended the Slide-show. |
| OSStatus SlideshowStop ( ); | This callback is called by the client to stop the Slideshow (in case the client quits, the computer is shut down, or the like.) |

In one embodiment, the present invention employs techniques described in pending U.S. patent applications cross-referenced above.

In particular, in one embodiment the present invention uses transition effects, user control techniques, and semi-transparency effects, similar to those described in the above-referenced patent applications.

In the above description, for purposes of explanation, numerous specific details are set forth in order to provide a thorough understanding of the invention. It will be apparent, however, to one skilled in the art that the invention can be practiced without these specific details. For example, the present invention can be applied in any type of application, and for displaying any type of data, including image and non-image files. The particular layouts and user interface elements described herein and illustrated in the Figures are examples only.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended to cover all such changes and modifications that come within the true spirit and scope of this invention.

What is claimed is:

1. A computer readable storage medium storing one or more programs, the one or more programs comprising instructions, which when executed by an electronic device with a display and one or more input devices, cause the electronic device to:
   while executing a first application and displaying a user interface of the first application, receive, via the one or more input devices, a request to display a slideshow corresponding to a plurality of media items;
   in response to receiving the request to display the slideshow:
      generate a slideshow that includes the plurality of media items in a sequence of media items;
      display, on the display, a representation of a first media item in the sequence of media items; and
      display, on the display, a control region that includes a plurality of slideshow controls for controlling the slideshow, including concurrently displaying in the control region:
         a play control for automatically playing the slideshow;
         a next item control for switching from displaying the first media item to displaying a second media item in the sequence of media items; and
         a first control that, when activated, initiates a process for sending a currently displayed media item to a second application executed by the electronic device, wherein the second application is distinct from the first application.

2. The computer readable storage medium of claim 1, wherein receiving the request to display the slideshow corresponding to the plurality of media items includes detecting selection of a slideshow creation object that corresponds to the plurality of media items.

3. The computer readable storage medium of claim 1, wherein receiving the request to display the slideshow corresponding to the plurality of media items includes detecting selection of a media item from a plurality of representations of media items displayed on the display.

4. The computer readable storage medium of claim 1, wherein displaying the control region that includes the plurality of slideshow controls includes displaying the plurality of slideshow controls in a semi-transparent toolbar.

5. The computer readable storage medium of claim 1, wherein displaying the control region that includes the plurality of slideshow controls for controlling the slideshow includes displaying a previous item control that, when activated, causes display of a previous media item in the sequence of media items.

6. The computer readable storage medium of claim 1, wherein displaying the control region that includes the plurality of slideshow controls for controlling the slideshow includes displaying a control that, when activated, causes a currently displayed representation of a media item to toggle between a full screen size and an actual size.

7. The computer readable storage medium of claim 1, wherein the one or more programs comprise instructions that cause the device to:
   determine whether the second application is available at the electronic device;
   in accordance with a determination that the second application is available at the electronic device, display the first control concurrently with the play control and next item control; and
   in accordance with a determination that the second application is not available at the electronic device, forgo display of the first control.

8. The computer readable storage medium of claim 1, wherein the one or more programs include instructions, which when executed by the electronic device, cause the electronic device to:
   while displaying the representation of the first media item in the sequence of media items and the control region that includes the plurality of slideshow controls for controlling the slideshow, receive an input corresponding to a respective control of the plurality of slideshow controls displayed in the control region;
   in response to receiving the input, determine a response from at least three possible responses to the input, including:
      in accordance with a determination that the input selects the play control in the control region, automatically play the slideshow;
      in accordance with a determination that the input selects the next item control, switch from displaying the first media item to displaying the second media item in the sequence of media items; and
      in accordance with a determination that the input selects the first control, initiate the process for sending the currently displayed media item to the second application executed by the electronic device.

9. The computer readable storage medium of claim 1, wherein the second application executed by the electronic device is a photo management application.

10. A method, comprising:
   at an electronic device with a display and one or more input devices:
      while executing a first application and displaying a user interface of the first application, receiving, via the one or more input devices, a request to display a slideshow corresponding to a plurality of media items;
      in response to the request to display the slideshow:
         generating a slideshow that includes the plurality of media items in a sequence of media items;
         displaying, on the display, a representation of a first media item in the sequence of media items;
         displaying, on the display, a control region that includes a plurality of slideshow controls for controlling the slideshow, including concurrently displaying in the control region:
            a play control for automatically playing the slideshow;

a next item control for switching from displaying the first media item to displaying a second media item in the sequence of media items; and a first control that, when activated, initiates a process for sending a currently displayed media item to a second application executed by the electronic device, wherein the second application is distinct from the first application.

11. The method of claim 10, wherein receiving the request to display the slideshow corresponding to the plurality of media items includes detecting selection of a slideshow creation object that corresponds to the plurality of media items.

12. The method of claim 10, wherein receiving the request to display the slideshow corresponding to the plurality of media items includes detecting selection of a media item from a plurality of representations of media items displayed on the display.

13. The method of claim 10, wherein displaying the control region that includes the plurality of slideshow controls includes displaying the plurality of slideshow controls in a semi-transparent toolbar.

14. The method of claim 10, wherein displaying the control region that includes the plurality of slideshow controls for controlling the slideshow includes displaying a previous item control that, when activated, causes display of a previous media item in the sequence of media items.

15. The method of claim 10, displaying the control region that includes the plurality of slideshow controls for controlling the slideshow includes displaying a control that, when activated, causes a currently displayed representation of a media item to toggle between a full screen size and an actual size.

16. The method of claim 10, including:
determining whether the second application is available at the electronic device;
in accordance with a determination that the second application is available at the electronic device, displaying the first control concurrently with the play control and next item control; and
in accordance with a determination that the second application is not available at the electronic device, forgo displaying the first control.

17. The method of claim 10, including:
while displaying the representation of the first media item in the sequence of media items and the control region that includes the plurality of slideshow controls for controlling the slideshow, receiving an input corresponding to a respective control of the plurality of slideshow controls displayed in the control region;
in response to receiving the input, determining a response from at least three possible responses to the input, including:
in accordance with a determination that the input selects the play control in the control region, automatically playing the slideshow;
in accordance with a determination that the input selects the next item control, switching from displaying the first media item to displaying the second media item in the sequence of media items; and
in accordance with a determination that the input selects the first control, initiating the process for sending the currently displayed media item to the second application executed by the electronic device.

18. The method of claim 10, wherein the second application executed by the electronic device is a photo management application.

19. An electronic device, comprising:
a display;
one or more input devices;
one or more processors;
memory; and
one or more programs, wherein the one or more programs are stored in the memory and configured to be executed by the one or more processors, the one or more programs including instructions for:
while executing a first application and displaying a user interface of the first application, receiving, via the one or more input devices, a request to display a slideshow corresponding to a plurality of media items;
in response to receiving the request to display the slideshow:
generating a slideshow that includes the plurality of media items in a sequence of media items;
displaying, on the display, a representation of a first media item in the sequence of media items;
displaying, on the display, a control region that includes a plurality of slideshow controls for controlling the slideshow, including concurrently displaying in the control region:
a play control for automatically playing the slideshow;
a next item control for switching from displaying the first media item to displaying a second media item in the sequence of media items; and
a first control that, when activated, initiates a process for sending a currently displayed media item to a second application executed by the electronic device, wherein the second application is distinct from the first application.

20. The electronic device of claim 19, wherein receiving the request to display the slideshow corresponding to the plurality of media items includes detecting selection of a slideshow creation object that corresponds to the plurality of media items.

21. The electronic device of claim 19, wherein receiving the request to display the slideshow corresponding to the plurality of media items includes detecting selection of a media item from a plurality of representations of media items displayed on the display.

22. The electronic device of claim 19, wherein displaying the control region that includes the plurality of slideshow controls includes displaying the plurality of slideshow controls in a semi-transparent toolbar.

23. The electronic device of claim 19, wherein displaying the control region that includes the plurality of slideshow controls for controlling the slideshow includes displaying a previous item control that, when activated, causes display of a previous media item in the sequence of media items.

24. The electronic device of claim 19, wherein displaying the control region that includes the plurality of slideshow controls for controlling the slideshow includes displaying a control that, when activated, causes a currently displayed representation of a media item to toggle between a full screen size and an actual size.

25. The electronic device of claim 19, wherein the one or more programs include comprise instructions for:
determining whether the second application is available at the electronic device;
in accordance with a determination that the second application is available at the electronic device, displaying the first control concurrently with the play control and next item control; and in accordance with a determination that the second application is not available at the electronic device, forgo displaying the first control.

26. The electronic device of claim 19, wherein the one or more programs include comprise instructions for:

while displaying the representation of the first media item in the sequence of media items and the control region that includes the plurality of slideshow controls for controlling the slideshow, receiving an input corresponding to a respective control of the plurality of slideshow controls displayed in the control region;

in response to receiving the input, determining a response from at least three possible responses to the input, including:

in accordance with a determination that the input selects the play control in the control region, automatically playing the slideshow;

in accordance with a determination that the input selects the next item control, switching from displaying the first media item to displaying the second media item in the sequence of media items; and in accordance with a determination that the input selects the first control, initiating the process for sending the currently displayed media item to the second application executed by the electronic device.

27. The electronic device of claim 19, wherein the second application executed by the electronic device is a photo management application.

* * * * *